W. T. ELZINGA.
DENTAL FLOSS HOLDER.
APPLICATION FILED FEB. 26, 1917.
1,332,170.
Patented Feb. 24, 1920.
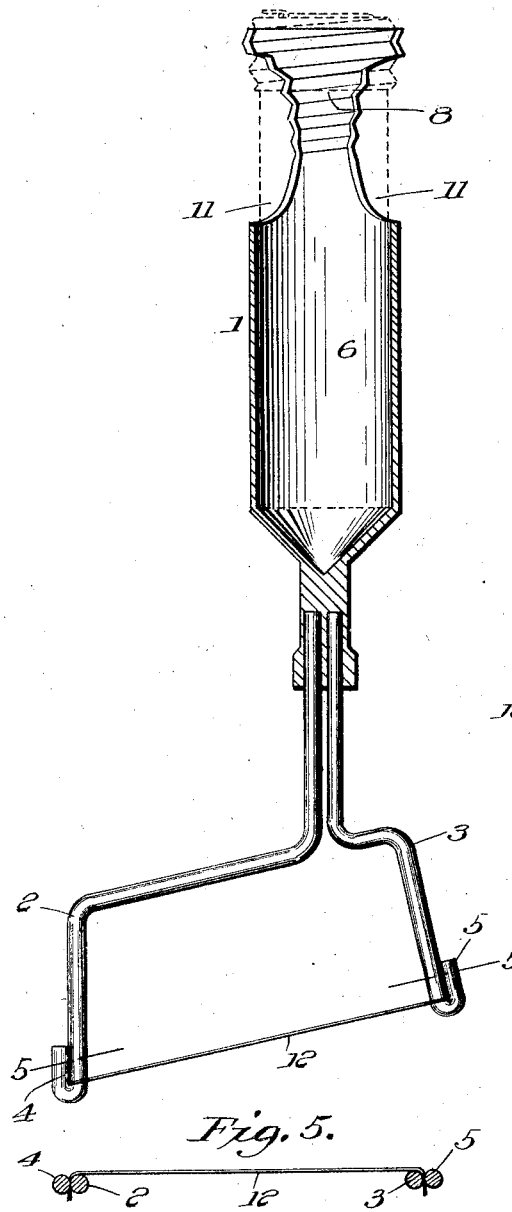
Fig. 1.
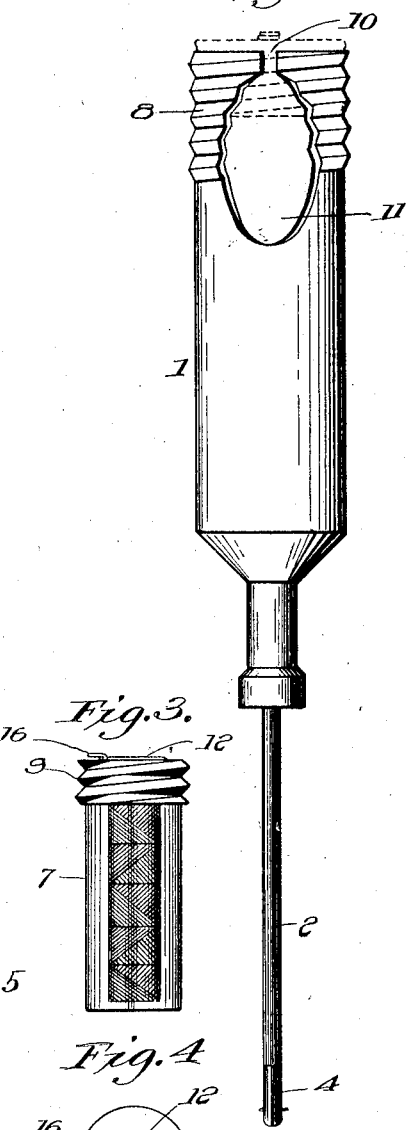
Fig. 2.
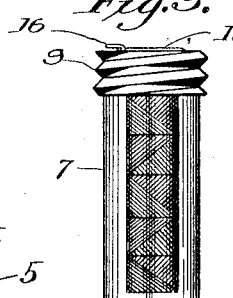
Fig. 3.
Fig. 4.
Fig. 5.
Witnesses:
Alan Franklin.
F. J. McCready.
Inventor
William T. Elzinga
By Harry C. Schroeder
Attorney

UNITED STATES PATENT OFFICE.

WILLIAM T. ELZINGA, OF MILL VALLEY, CALIFORNIA.

DENTAL-FLOSS HOLDER.

1,332,170.   Specification of Letters Patent.   Patented Feb. 24, 1920.

Application filed February 26, 1917. Serial No. 151,045.

*To all whom it may concern:*

Be it known that I, WILLIAM T. ELZINGA, citizen of the United States, residing at Mill Valley, in the county of Marin and State of California, have invented certain new and useful Improvements in Dental-Floss Holders, of which the following is a specification.

The invention is a holder for dental floss.

The holder comprises means for holding a piece of dental floss taut so as to be inserted between the teeth, and a handle which may be grasped to manipulate the holder so that the floss may be drawn between the teeth to clean the adjacent surfaces of the teeth.

The holder also comprises a receptacle holder which may be formed within the handle of the holder for holding a container containing dental floss from which container clean pieces of floss may from time to time be conveniently taken to replace the used pieces of floss on the floss holding means.

Other features of the invention will appear hereinafter.

The invention is illustrated in the accompanying drawing which forms a part of this specification and the appended claims.

Referring to the drawing:

Figure 1 is a vertical sectional view of the device.

Fig. 2 is an elevation thereof.

Fig. 3 is a view of a commercial container containing dental floss which may be conveniently placed and held within the hollow handle of the device.

Fig. 4 is a top view of said container.

Fig. 5 is a sectional view of the floss holding means taken on line 5—5 of Fig. 1.

Numeral 1 indicates the handle of the device in one end of which is secured two arms 2 and 3 which may be of wire. The arms extend out from the end of the handle and are of such length and shape that their outer ends are spaced at a distance apart and the end of arm 2 extends out beyond the end of arm 3. The extremities of the arms 2 and 3 are bent upon the arms, forming clamps 4 and 5 to hold the ends of a piece of dental floss with the floss drawn taut for use.

The handle 1 may be hollow to form a receptacle holder 6 for holding a container 7 containing dental floss such as may be purchased at a drug store. The outer end of the receptacle is open, through which the floss container may be introduced into the receptacle. The outer end of the receptacle is formed with a thread 8 into which the threaded cap 9 of the container may screw to hold the container within the receptacle. The outer end of the receptacle may be split at 10 to give resiliency to the threaded end of the receptacle so that the container cap may screw easily thereinto and so that said threaded receptacle end may clamp the container cap and prevent it working out of said threaded receptacle end and the container falling out of the receptacle. The receptacle may be provided with openings 11 through which the floss may be seen through the glass container 7 in order to determine how much floss is in the container without removing the container from the receptacle.

The operation of the device is as follows:

The end of the floss 12 projecting through the hole 15 in the container cap and held under the cap cutter 16, is first removed from under the cutter and pulled outward until a piece of floss of the desired length sufficient to extend from the clamp 4 to clamp 5 is withdrawn from the container. The floss is then brought under the cutter 16 on the container cap and a piece of floss the desired length cut off from the floss in the container: the end of the floss projecting from the container through the cap hole 15 remaining and being held under the cutter 16 so that it may be again readily grasped to withdraw another piece of floss from the container when desired. The piece of floss cut from the container is then extended between the ends of the arms 2 and 3 and the floss drawn taut and its ends inserted in and clamped by clamps 4 and 5, whereby the floss is held taut. The floss between the arms is then inserted between the teeth and the handle 1 grasped and moved back and forth so that the floss is moved lengthwise back and forth between the teeth until the floss cleans the adjacent surfaces of the teeth. The floss is then removed from the clamps and thrown away so that a clean piece of floss may be replaced in the clamps between the arms for further use.

It is to be noted that the arm 2 extends considerably farther to one side of the handle than the arm 3 so as to extend the floss sufficiently within the mouth to enable the handle to be moved sufficiently without striking the face of the patient to give the floss sufficient movement to clean the teeth properly.

Having described my invention, I claim as new and desire to secure by Letters Patent:

1. A device of the character disclosed including a hollow handle, a pair of wire arms fixed in one end of said handle and formed with floss holding means on their extremities, and means on said handle for holding a commercial floss container within.

2. A device of the character as disclosed comprising a handle, means on the handle for holding a piece of dental floss so that it may be inserted between the teeth and the handle manipulated to draw the floss between the teeth to clean the teeth, said handle being hollow to hold a container of dental floss, said handle being provided with a threaded portion into which the threaded cap of the floss container may screw to hold the container within the handle.

3. A device of the character as disclosed comprising a handle, means on the handle for holding a piece of dental floss so that it may be inserted between the teeth and the handle manipulated to draw the floss between the teeth to clean the teeth, said handle being hollow to hold a container of dental floss, means for preventing the container from falling out of the handle, said handle being provided with an opening through which the floss in the container may be observed.

4. A device of the character as disclosed comprising a handle, means on the handle for holding a piece of dental floss so that it may be inserted between the teeth and the handle manipulated to draw the floss between the teeth to clean the teeth, said handle being hollow to hold a container of dental floss, said handle being threaded at its outer end to screw onto the threaded container cap to hold the container within the handle, said threaded outer end of the handle being split to give a spring action thereto to clamp said container.

In testimony whereof I affix my signature.

WILLIAM T. ELZINGA.